United States Patent Office 2,950,281
Patented Aug. 23, 1960

2,950,281

Δ⁵-3-ETHYLENEDIOXY-11,20-DIKETO-21-IODO-PREGNENE

Lewis H. Sarett, Princeton, N.J., assignor to Merck & Co. Inc., Rahway, N.J., a corporation of New Jersey No Drawing. Original application Sept. 17, 1952, Ser. No. 310,135, now Patent No. 2,777,842, dated Jan. 15, 1957. Divided and this application Nov. 1, 1955, Ser. No. 544,373

3 Claims. (Cl. 260—239.55)

This invention relates to novel steroid compounds and processes of obtaining the same. More particularly, it is concerned with a process for the preparation of 11-dehydrocorticosterone and 21-acyl derivatives thereof from derivatives of 11-keto progesterone.

This application is a division of Serial No. 310,135, filed September 17, 1952, now U.S. Patent No. 2,777,842, issued January 15, 1957.

The successful completion of a method for the preparation of dl-11-keto progesterone by total synthesis has been described in copending application Serial No. 310,133, filed September 17, 1952, now abandoned.

It is an object of my invention to provide a process for converting 11-keto progesterone to the adrenal hormone, 11-dehydrocorticosterone, and its 21-acyl derivatives.

It is a further object of my invention to provide novel derivatives of 11-keto progesterone which are suitable intermediates for the preparation of 11-dehydrocorticosterone and acyl derivatives thereof.

Other objects will be apparent from the detailed description of my invention hereinafter provided.

In accordance with the present invention, it is now found that derivatives of 11-keto progesterone wherein the 3-keto substituent is blocked or protected by a suitable radical convertible to keto by hydrolysis can be converted to 11-dehydrocorticosterone by the process which can be shown as follows:

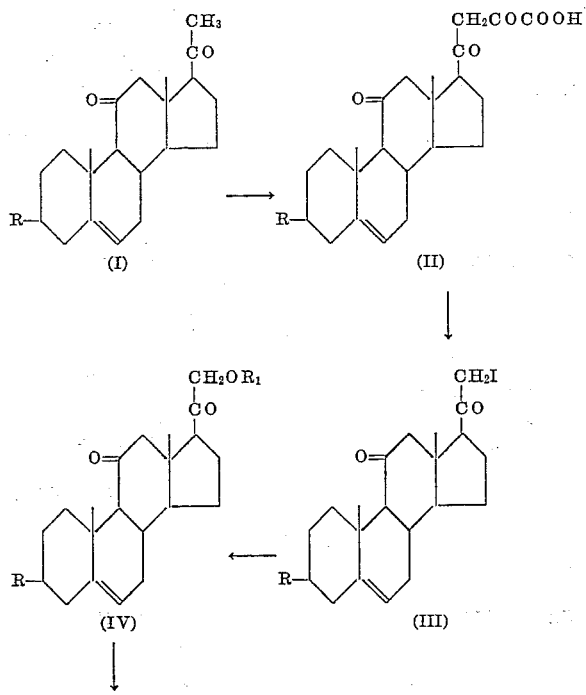

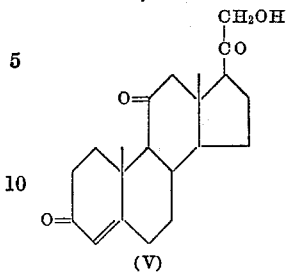

wherein R represents a group convertible to keto by hydrolysis, and R₁ represents an acyl radical.

In this process the 11-keto progesterone derivative (1) is first reacted with an oxalic acid diester in the presence of a strong alkali to form the corresponding etienoyl-pyruvic acid compound (II). This etienoylpyruvic acid derivative is then reacted in a buffered solution with a solution of iodine to form the corresponding 21-iodo compound (III). Upon reacting the 21-iodo compound with an alkali metal salt of a lower aliphatic carboxylic acid, the corresponding 21-acyl derivative of 11-dehydrocorticosterone (IV) is obtained. This acyloxy derivative can then be hydrolyzed to remove the acyl substituent and the group protecting the 3-keto substituent to obtain 11-dehydrocorticosterone (V).

The methods of my invention will be more readily understood by the application of these processes to the preparation of 11-dehydrocorticosterone from the 3-ethylenedioxy derivative of 11-keto progesterone. In this process, the starting material, 3-ethylenedioxy-11-keto progesterone, is first reacted with an oxalic acid diester in the presence of a strong alkali in a suitable inert medium to obtain 3-ethylenedioxy-11-keto-etienoylpyruvic acid. In carrying out this reaction, I usually prefer to employ an oxalic acid diester of a lower alkanol, such as dimethyl oxalate or diethyl oxalate, since these esters are readily and conveniently obtained. Alkali metal alkoxides such as sodium methoxide, potassium ethoxide, and the like, are suitable strong alkalis which may be used in this condensation reaction. Inert organic solvents such as benzene, toluene, xylene, petroleum hydrocarbons, and the like, are satisfactory for use as solvent mediums in carrying out this reaction. Thus, the preparation of Δ⁵-3-ethylenedioxy-11-keto-etienoylpyruvic acid is most conveniently effected by reacting the 3-ethylenedioxy derivative of 11-keto progesterone with dimethyl oxalate in the presence of sodium methoxide in a benzene medium. The resulting mixture is permitted to stand at room temperature for about 10–20 hours in order to complete the formation of the desired etienoylpyruvic acid compound. Upon completion of the reaction, the mixture is cautiously acidified and the pyruvic acid compound can be readily recovered by extraction with a water immiscible solvent such as ether and evaporation of the solvent extracts.

The etienoylpyruvic acid compound is then converted to the corresponding 21-iodo compound by reaction with iodine. This reaction is most conveniently carried out by intimately contacting an aqueous solution of Δ⁵-3-ethylenedioxy-11-keto-etienoylpyruvic acid buffered with an agent such as disodium phosphate with iodine. The preparation of the 21-iodo compound is completed by allowing the reaction mixture to stand at room temperature for about 10–20 hours. After the reaction is complete, the resulting mixture is extracted with a water immiscible solvent such as ether. Upon evaporating the ethereal extract, the desired iodo compound is obtained. It is desirable in carrying out the preparation of the iodo compound to protect the reaction mixture and the formed iodo compound from light in order to avoid decomposition of this product.

The $\Delta^5$-3-ethylenedioxy-11,20-diketo-21-iodopregnene is then converted to $\Delta^5$-3-ethylenedioxy-11,20-diketo-21-acyloxypregnene by reaction with an alkali metal salt of a lower aliphatic acid. This reaction is conveniently carried out by heating a solution of the iodo compound dissolved in acetone under reflux with potassium acetate for about one hour. After completion of the reaction, the product is readily recovered by evaporating the acetone under diminished pressure, extracting the resulting residue with ether and evaporating the ethereal extract.

The $\Delta^5$-3-ethylenedioxy-11,20-diketo-21-acetoxypregnene so obtained is readily hydrolyzed to obtain 11-dehydrocorticosterone. The 21-acyl substituent is conveniently removed by hydrolysis with an alkali and the 3-ethylenedioxy substituent can then be hydrolyzed by treatment with acid to form 11-dehydrocorticosterone.

In carrying out the processes described above, I may employ as the starting material either the 3-ethylenedioxy derivative of d-11-keto progesterone, which may be prepared as described in copending application Serial No. 310,136, filed September 17, 1952, now U.S. Patent No. 2,743,271, issued April 24, 1956 or the dl-11-keto progesterone which may be obtained as described in copending application Serial No. 310,133, filed September 17, 1952. When the d-isomeric form is used as the starting material, the product obtained is identical with naturally occuring 11-dehydrocorticosterone. When the racemic mixture is used as the starting material, a racemic mixture of the d- and l- forms of 11-dehydrocorticosterone is obtained.

The 3-ethylenedioxy derivative of dl-11-keto progesterone utilized as the starting material in the process of this invention can be obtained by processes described in copending application Serial No. 310,133, filed September 17, 1952, in accordance with the reactions shown on the following flow sheet:

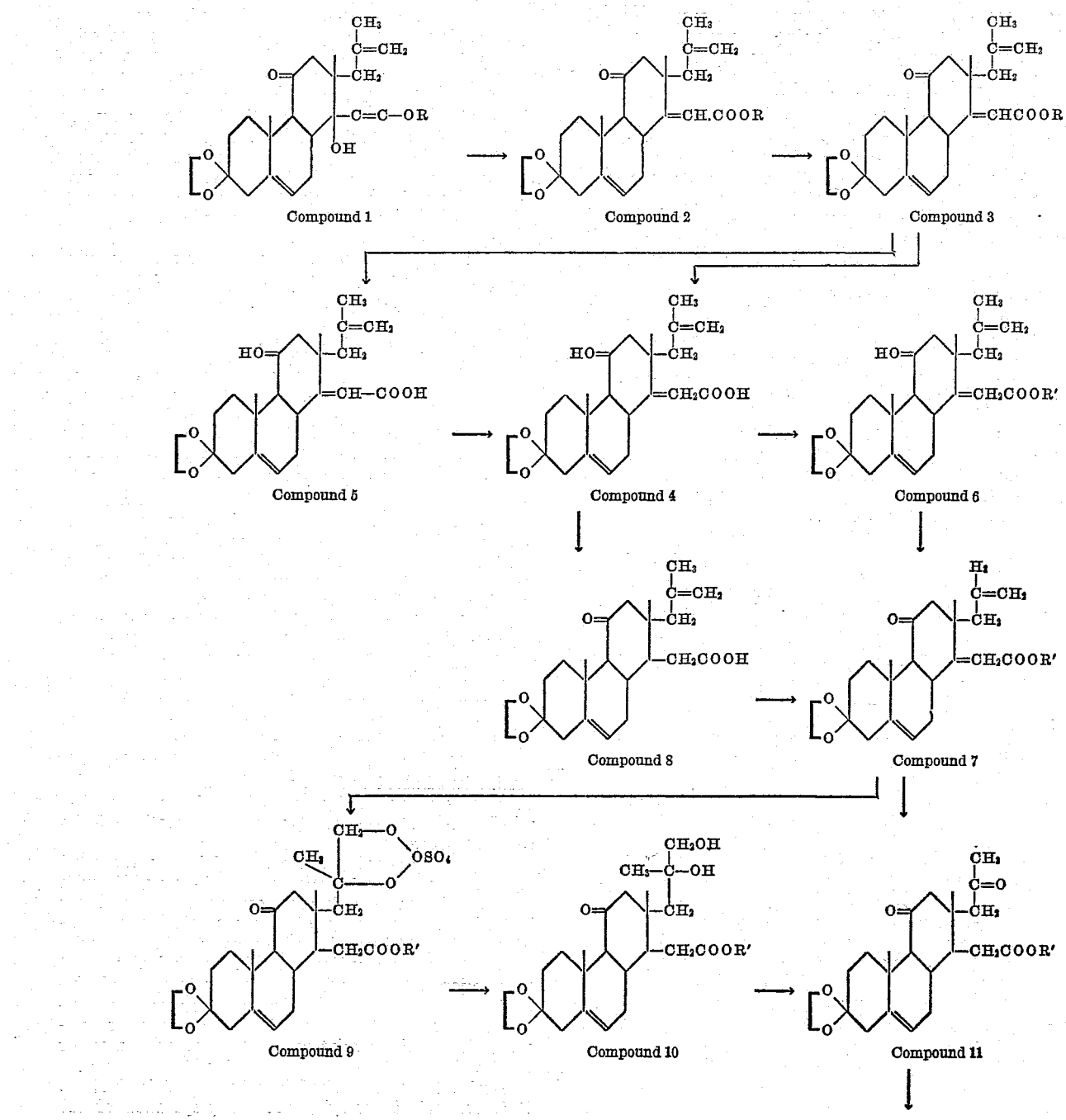

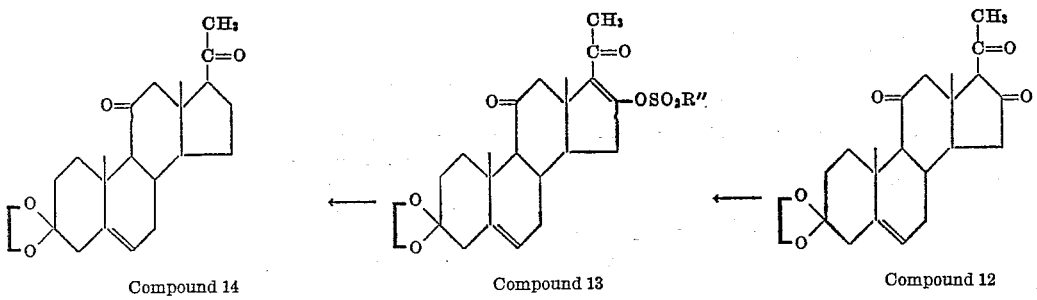

Compound 14   Compound 13   Compound 12 wherein R and R' are alkyl radicals and R'' is an organic radical.

In this process, 1-alkoxy-ethinyl-1-hydroxy-2-methallyl-2,4b-dimethyl-4-keto-7-ethylenedioxy-1,2,3,4,4a,4b,5,6,7,8,10,10a-dodecahydrophenanthrene (Compound 1) is reacted with a dilute aqueous mineral acid solution to produce the corresponding 1-carboalkoxymethylene-2-methallyl-2,4b-dimethyl-4-keto-7-ethylenedioxy-1,2,3,4,4a,4b,5,6,7,8,10,10a - dodecahydrophenanthrene (Compound 2); the latter compound is reacted with an alkaline saponifying agent thereby forming 1-carboxymethylene-2-methallyl-2,4b-dimethyl-4-keto-7-ethylenedioxy-1,2,3,4,4a,4b,5,6,7,8,10,10a - dodecahydrophenanthrene (Compound 3). The 1-carboxymethylene - 2 - methallyl-2,4b-dimethyl-4-keto - 7 - ethylenedioxy - 1,2,3,4,4a,4b,5,6,7,8,10,10a-dodecahydrophenanthrene is then reacted with an alkali metal in a lower alkanol or in liquid ammonia to produce 1-carboxymethyl - 2 - methallyl-2,4b-dimethyl-4-hydroxy - 7 - ethylenedioxy - 1,2,3,4,4a,4b,5,6,7,8,10,10a-dodecahydrophenanthrene (Compound 4). Alternatively, this reduction operation, which involves the reduction of both the C-4 keto group to hydroxy and the 1-carboxymethylene radical to a carboxymethyl grouping, can be carried out step-wise by reacting the 1-carboxymethylene-2-methallyl-2,4b-dimethyl - 4 - keto-7-ethylenedioxy-1,2,3,4,4a,4b,5,6,7,8,10,10a - dodecahydrophenanthrene with an alkali metal borohydride or alkaline earth metal borohydride to form the corresponding 1-carboxymethylene-2-methallyl-2,4b-dimethyl-4-hydroxy-7-ethylenedioxy-1,2,3,4,4a,4b,5,6,7,8,10,10a - dodecahydrophenanthrene (Compound 5); the latter compound is reacted with an alkali metal in a lower alkanol or in liquid ammonia to produce 1 - carboxymethyl - 2 - methallyl - 2,4b - dimethyl-4-hydroxy - 7 - ethylenedioxy - 1,2,3,4,4a,4b,5,6,7,8,10,10a-dodecahydrophenanthrene (Compound 4). This compound is reacted with an esterifying agent, preferably an alkyl iodide in the presence of a base and/or a diazoalkane to produce the corresponding 1-carboalkoxymethyl - 2 - methallyl - 2,4b - dimethyl - 4 - hydroxy - 7-ethylenedioxy - 1,2,3,4,4a,4b,5,6,7,8,10,10a - dodecahydrophenanthrene (Compound 6). This compound is reacted with an oxidizing agent, preferably under alkaline conditions, thereby forming the corresponding 1-carboalkoxymethyl-2-methallyl - 2,4b-dimethyl-4-keto-7-ethylenedioxy - 1,2,3,4,4a,4b,5,6,7,8,10,10a - dodecahydrophenanthrene (Compound 7); alternatively, 1-carboxymethyl-2-methallyl-2,4b-dimethyl - 4 - hydroxy - 7 - ethylenedioxy-1,2,3,4,4a,4b,5,6,7,8,10,10a-dodecahydrophenanthrene can be reacted with an oxidizing agent to produce 1-carboxymethyl - 2 - methallyl - 2,4b - dimethyl-4-keto-7-ethylenedioxy - 1,2,3,4,4a,4b,5,6,7,8,10,10a - dodecahydrophenanthrene (Compound 8), which is then reacted with an esterifying agent to form the corresponding 1-carboalkoxymethyl - 2 - methallyl - 2,4b - dimethyl-4-keto-7-ethylenedioxy - 1,2,3,4,4a,4b,5,6,7,8,10,10a - dodecahydrophenanthrene (Compound 7). The latter compound is reacted with osmium tetroxide to form the osmate ester of 1-carboalkoxymethyl-2-(beta,gamma-dihydroxyisobutyl)-2,4b-dimethyl - 4 - keto - 7 - ethylenedioxy-1,2,3,4,4a,4b,5,6,7,8,10,10a-dodecahydrophenanthrene (Compound 9), which is reacted with an aqueous alcoholic solution of an alkali metal sulfite or bisulfite to produce the corresponding 1-carboalkoxymethyl - 2 - (beta,gamma-dihydroxyisobutyl)-2,4b-dimethyl - 4 - keto-7-ethylyenedioxy-1,2,3,4,4a,4b,5,6,7,8,10,10a-dodecahydrophenanthrene compound (Compound 10); the 1 - carboalkoxymethyl - 2 - (beta, gamma-dihydroxyisobutyl) - 2,4b - dimethyl - 4 - keto-7-ethylenedioxy - 1,2,3,4,4a,4b,5,6,7,8,10,10a-dodecahydrophenanthrene is reacted with periodic acid to form the corresponding 1 - carboalkoxymethyl-2-acetonyl-2,4b-dimethyl - 4 - keto - 7 - ethylenedioxy-1,2,3,4,4a,4b,5,6,7,8,10,10a-dodecahydrophenanthrene (Compound 11). Alternatively, the 1-carboalkoxymethyl - 2 - methallyl-2,4b-dimethyl-4-keto - 7 - ethylenedioxy-1,2,3,4,4a,4b,5,6,7,8,10,10a-dodecahydrophenanthrene (Compound 7) can be reacted with ozone followed by hydrolysis of the ozonide thereby forming directly the corresponding 1-carboalkoxymethyl-2-acetonyl - 2,4b - dimethyl-4-keto-7-ethylenedioxy - 1,2,3,4,4a,4b,5,6,7,8,10,10a - dodecahydrophenanthrene (Compound 11). The latter compound is reacted, under substantially anhydrous conditions, with a strong alkali thereby forming $\Delta^5$-3-ethylenedioxy-11,16,20-triketo-pregnene (Compound 12). The $\Delta^5$-3-ethylenedioxy-11,16,20-triketo-pregnene is reacted with an organic sulfonyl halide thereby forming the corresponding sulfonate ester of $\Delta^{5,16}$-3-ethylenedioxy-11,20-diketo - 16 - hydroxypregnadiene (Compound 13), which is reacted with hydrogen in the presence of a hydrogenation catalyst to produce dl-$\Delta^5$-3-ethylenedioxy - 11,20 - diketo - pregnene (Compound 14).

The 3-ethylenedioxy derivative of d-11-keto progesterone employed as the starting material in the process of this application may be prepared as described in copending application Serial No. 310,136, filed September 17, 1952. This involves treating dl-3-ethylenedioxy-11,20-diketo-$\Delta^5$-pregnene with dimethyl oxalates and then with alkali to form the C–21 oxalyl acid derivative. Upon forming the strychnine salts of the components of this racemic mixture the d salt precipitates and may be recovered by filtration. The decomposition of the strychnine salt and hydrolysis of the C–21 oxalyl group yields d-3-ethylenedioxy-11,20-diketo-$\Delta^5$-pregnene identical with that obtained from naturally occurring material.

The following examples illustrate methods of carrying out processes of my invention.

EXAMPLE 1

$\Delta^5$-3-ethylenedioxy-11-keto-etienoylpyruvic acid

A mixture of 1.3 g. of dry sodium methoxide, 3.0 g. of dimethyl oxalate and 2.50 g. of the 3-ethylenedioxy derivative of d-11-keto progesterone, prepared as described in copending application Serial No. 310,136, filed September 17, 1952, was dissolved in 20 cc. of dry benzene. The solution was permitted to stand at room temperature for 20 hours, poured into ice water, and carefully acidified with dilute sulfuric acid and excess sodium dihydrogen phosphate. The liberated organic product was dissolved in ether, and the ethereal layer extracted with 55 cc. of aqueous 1 N potassium hydroxide. After standing at room temperature for one hour, the alkaline extract was cooled and acidified as before. The liberated acid was extracted twice with ether, the ethereal solution washed and concentrated to dryness in vacuo. Crystallization of the residue from ether yielded d-$\Delta^5$-3-ethylenedioxy-11-keto-etienoylpyruvic acid, dec. 180–182° C.

The above procedure was repeated using as starting material dl-$\Delta^5$-3-ethylenedioxy-11,20-diketo-pregnene, prepared as described in copending application Serial No. 310,133, filed September 17, 1952, obtained by total synthesis. The product, dl-$\Delta^5$-3-ethylenedioxy-11-keto-etienoylpyruvic acid, was crystallized from ether (M.P. 174–7° C. dec.).

EXAMPLE 2

$\Delta^5$-3-ethylenedioxy-11,20-diketo-21-acetoxy-pregnene

To a solution of 1.804 g. of d-$\Delta^5$-3-ethylenedioxy-11-keto-etienoylpyruvic acid in 450 cc. of water containing 20 g. of disodium phosphate was slowly added with stirring a suspension of 1.05 g. of iodine in 100 cc. of ether. After the iodine color had disappeared, a solution of 1 g. of potassium hydroxide in 30 cc. of water was added and the mixture protected from light and stirred for 20 hours. The ethereal layer was then separated, dried and evaporated in vacuo. The crude crystalline iodo ketone thus obtained was dissolved in 70 cc. of acetone and refluxed with 6 g. of potassium acetate for one hour. After evaporation of the acetone in vacuo, the product was extracted with ether, the ethereal solution washed with water, dried and evaporated. The crystalline residue was purified by chromatography on alumina. Elution with petroleum ether-ether gave d-$\Delta^5$-3-ethylenedioxy-11,20-diketo-21-acetoxy-pregnene, M.P. 195° C.

Upon hydrolyzing d-$\Delta^5$-3-ethylenedioxy-11,20-diketo-21-acetoxy-pregnene with alkali there is obtained the 3-ethylenedioxy derivative of 11-dehydrocorticosterone. When the latter compound is further hydrolyzed by treatment with acid, the 3-ethylenedioxy substituent is cleaved and 11-dehydrocorticosterone which is identical with naturally occurring 11-dehydrocorticosterone (Kendall's Compound A), is obtained.

The above procedure was repeated using as starting material dl-$\Delta^5$-3-ethylenedioxy-11-ketoetienoylpyruvic acid. The crystalline product was purified by chromatography on alumina. Elution with benzene-ether gave after evaporation of the eluate dl-$\Delta^5$-3-ethylenedioxy-11,20-diketo-21-acetoxypregnene (M.P. 190–92° C.).

Upon hydrolyzing dl-$\Delta^5$-3-ethylenedioxy-11,20-diketo-21-acetoxy-pregnene with alkali there is obtained the 3-ethylenedioxy derivative of dl-11-dehydrocorticosterone. By subjecting the latter product to hydrolysis with acid the ethylenedioxy substituent is cleaved to form the dl-11-dehydrocorticosterone, the racemic form of 11-dehydrocorticosterone.

Various changes and modifications may be made in carrying out the present invention without departing from the spirit and scope thereof. Insofar as these changes and modifications are within the scope of the appended claims, they are to be considered as part of this invention.

I claim:

1. $\Delta^5$-3-Ethylenedioxy - 11,20 - diketo - 21 - iodopregnene.

2. d-$\Delta^5$-3-Ethylenedioxy - 11,20 - diketo - 21 - iodopregnene.

3. dl-$\Delta^5$-3-Ethylenedioxy - 11,20 - diketo - 21 - iodopregnene.

References Cited in the file of this patent

UNITED STATES PATENTS

| | | |
|---|---|---|
| Re. 22,941 | Reichstein | Nov. 25, 1947 |
| 2,438,715 | Miller et al. | Mar. 30, 1948 |